Aug. 21, 1934.      B. W. HEYMAN      1,971,321
STOCKING AND METHOD OF MAKING SAME
Filed May 17, 1932      4 Sheets-Sheet 1
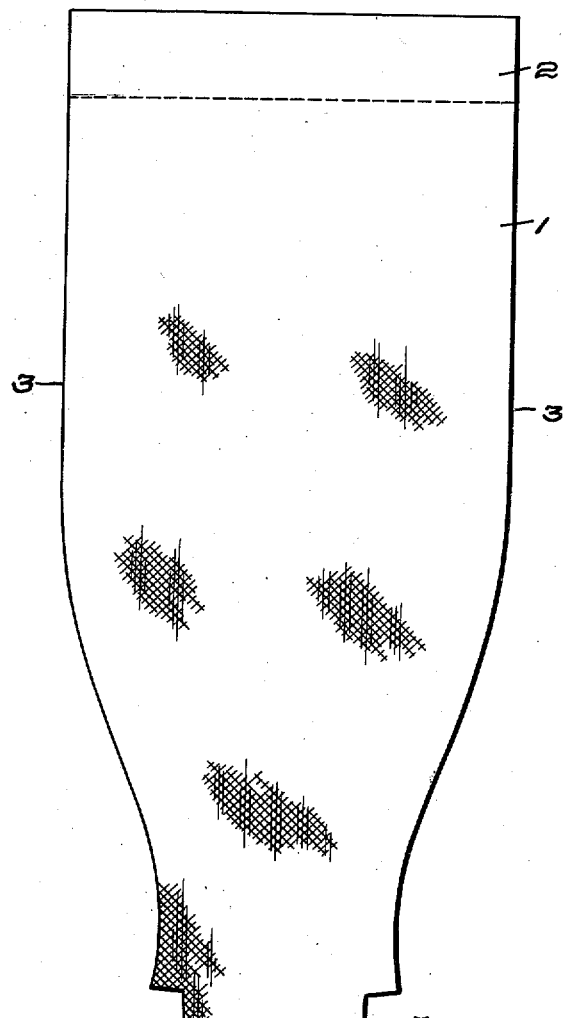
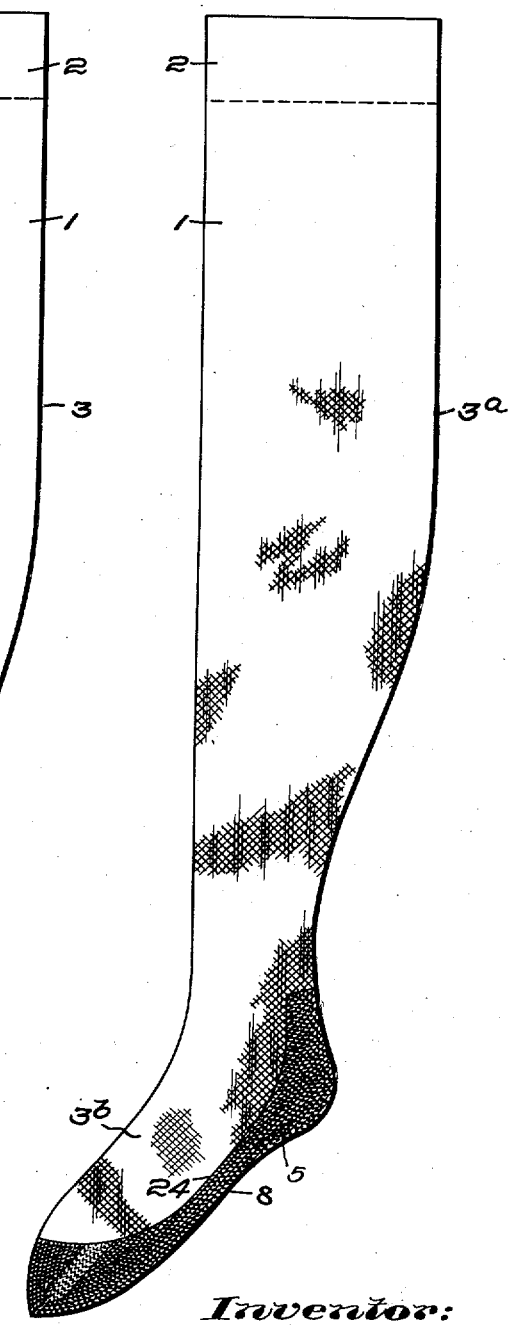
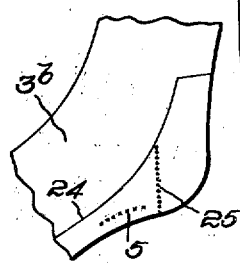
Inventor:
Benjamin W. Heyman
by Emery Booth Varney Townsend Attys Aug. 21, 1934.    B. W. HEYMAN    1,971,321
STOCKING AND METHOD OF MAKING SAME
Filed May 17, 1932    4 Sheets-Sheet 2
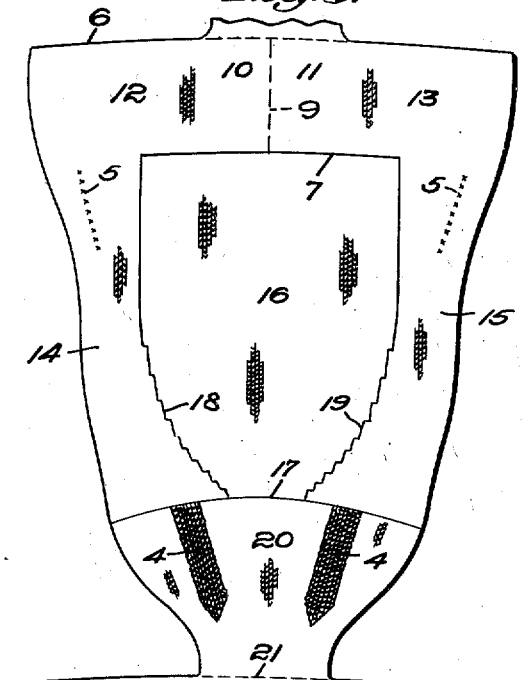
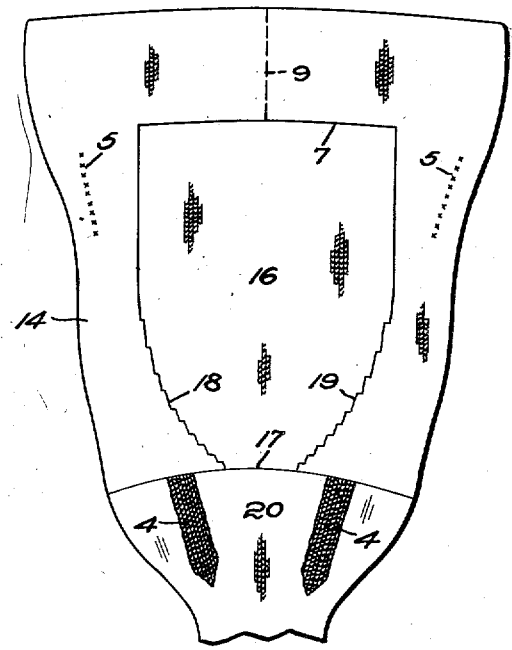
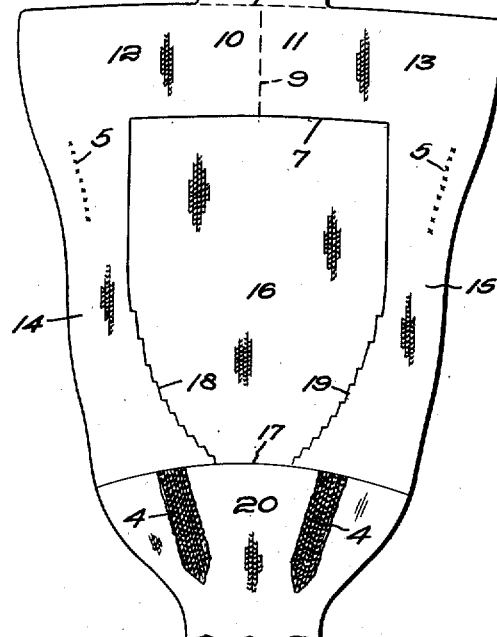
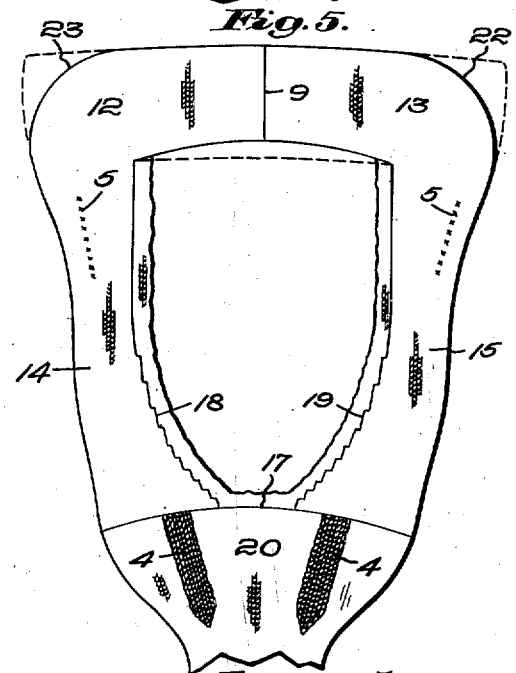
Inventor:
Benjamin W. Heyman

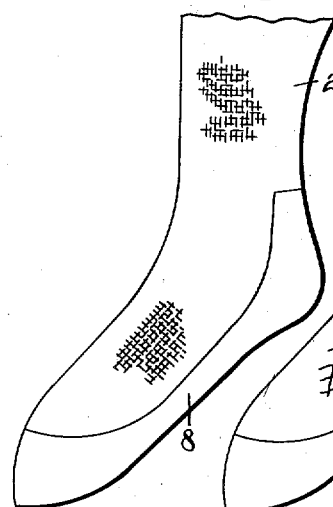
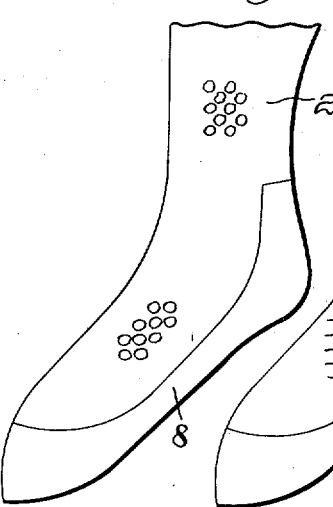

Aug. 21, 1934.   B. W. HEYMAN   1,971,321
STOCKING AND METHOD OF MAKING SAME
Filed May 17, 1932   4 Sheets-Sheet 4
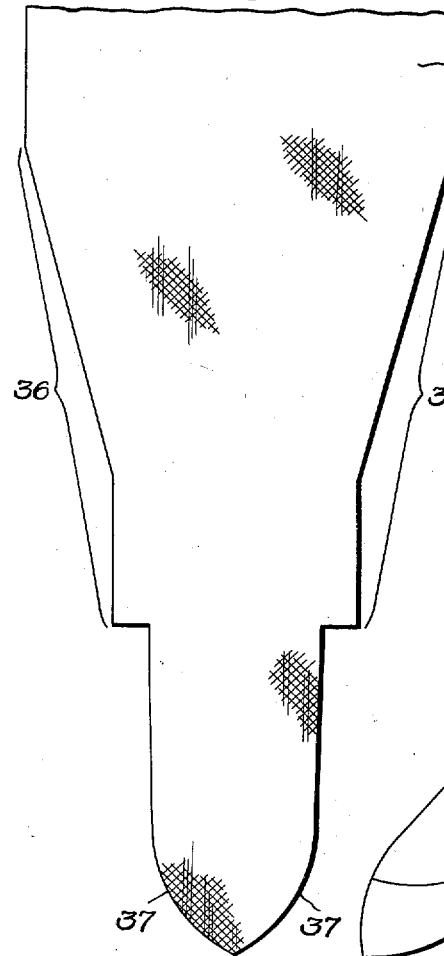
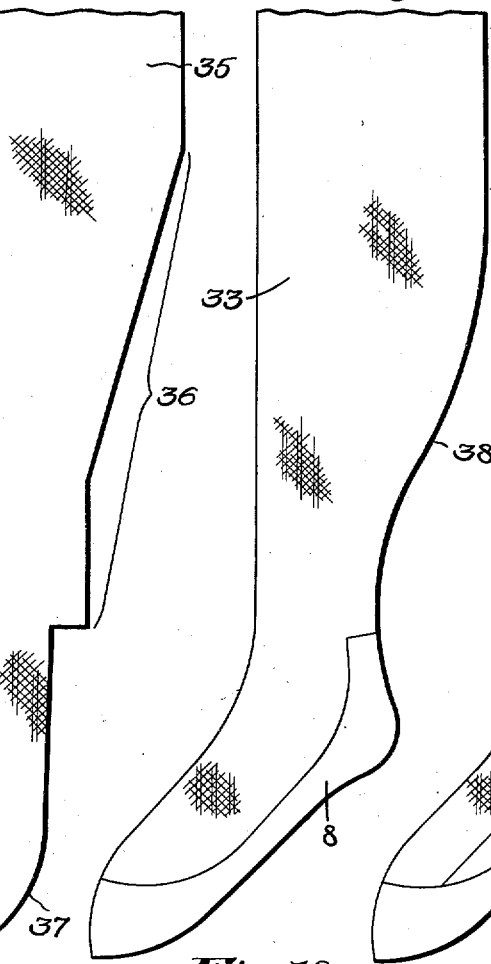
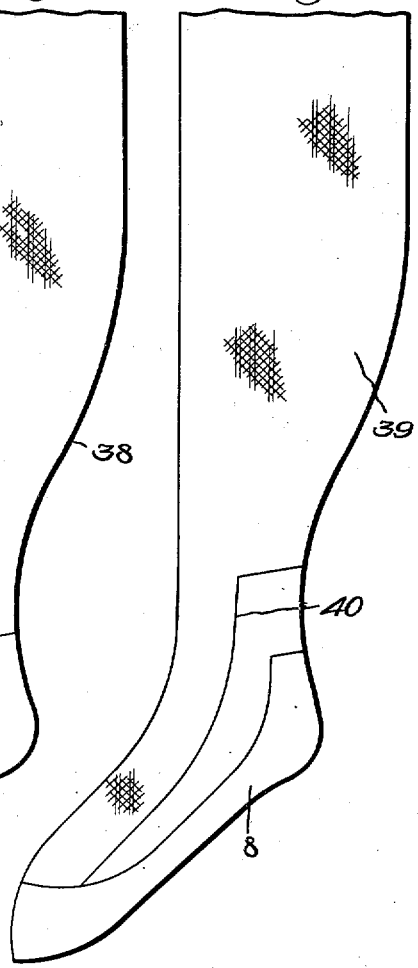
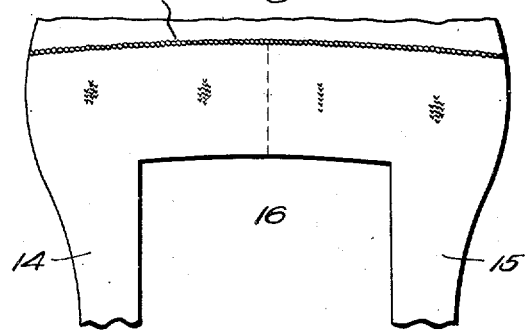
Inventor:
Benjamin W. Heyman
by Emery, Booth, Varney & Townsend
Attys Patented Aug. 21, 1934

1,971,321

UNITED STATES PATENT OFFICE 1,971,321

STOCKING AND METHOD OF MAKING SAME

Benjamin W. Heyman, Philadelphia, Pa., assignor of one-half to Stanton D. Sanson, Phoenixville, Pa.

Application May 17, 1932, Serial No. 611,786

8 Claims. (Cl. 66—183)

This invention relates to stockings and methods of making the same.

In order that the principle of the invention may be readily understood, I have disclosed a single embodiment thereof in the accompanying drawings, wherein—

Fig. 1 is a plan view of a blank for the leg and top of the foot of the stocking;

Fig. 2 is a side elevation of the completed stocking;

Fig. 3 is a plan view of a part of a continuous blank from which the high splice, heel, sole of the foot and toe are made;

Fig. 4 is a plan view of a single blank before trimming;

Fig. 5 is a similar view of the same blank after trimming at the heel portions;

Fig. 6 is a detail on a small scale in side elevation showing a slight modification;

Figs. 7 to 14 inclusive show my invention applied to stocking legs formed respectively as follows; woven, mesh, close knitted, Milanese, lace knitted, crocheted and tatted;

Figs. 15 and 16 represent respectively a cut blank, and in side elevation a cut stocking formed from said blank and having my invention applied thereto;

Fig. 17 represents in side elevation my invention applied to a circumferentially knit stocking, having, however, an ankle, or ankle and foot, formed by split work knitting; and Fig. 18 is a detail in plan to show the provision of a loose course to indicate where the blank is to be cut transversely.

The purpose of my invention is to provide as a unitary selvaged blank a fabric containing as integral parts thereof the high splice above the heel, the heel, the sole of the foot and the toe. Said unitary selvaged blank, when completed, is adapted to be and is secured or attached in any suitable manner to the stocking leg and instep portion or top of the foot. It is therefore immaterial what the character of the leg of the stocking may be inasmuch as the said unitary blank may be attached to any type of stocking leg and upper portion of the foot, though preferably the same is attached to a stocking of the full fashioned character.

Referring more particularly to the drawings, I have in Figs. 1 and 2 represented at 1 the leg portion of a stocking which may or may not have a top welt, though the same is indicated at 2. If the stocking leg be of the full fashioned type, it is knitted as a flat, shaped blank and would desirably have selvage edges as indicated at 3, which are seamed together in the usual manner along the line 3a.

The stocking leg 1 and the upper portion of the foot 3b may be of any desired material and formed in any suitable way. For example, the stocking leg may be woven, or it may be formed as a mesh, or as a close knitted plain fabric, or as a Milanese fabric or as a lace, netted, crochet or tatted fabric. It may be constructed from any suitable material, whether natural or artificial fibres.

The leg may, as stated, be a full fashioned leg or it may be of what is customarily referred to as "cut" material, or it may be formed as a seamless or tubular knit fabric upon any suitable circular knitting machine, in which event the top of the foot and the ankle would preferably be formed by split-work knitting. In fact, my invention is in nowise limited with respect to the structure or character of the leg portion and instep or top of the foot, the invention being directed particularly to the high splice, heel, sole and toe portions constituting a unitary, selvaged blank to be, when completed, suitably secured to the leg and top of the foot portion by sewing, seaming, looping or otherwise.

In order to produce the said unitary blank, I may and preferably do use a footer so that the said unitary blank may be knitted with full fashioned characteristics in the toe as indicated at 4 in Figs. 3, 4 and 5. If desired, but not necessarily, there may also be full fashioned structures in the lower part of the heel as indicated at 5 in Figs. 3, 4 and 5. It is, however, not imperative that the full fashioned structures be employed.

Assuming, however, for the purpose of explaining one selected embodiment only of my invention, it will be understood that the knitting of the blank may be begun at a line 6 of Fig. 3. If, for any reason, the knitting is begun at a preceding point, it is desirable that a loose course be provided at the line 6, so that there may be an indication for cutting the blank transversely. The fabric of the blank is knitted of the greatest desired width beginning at or near the line 6, and preferably two threads are supplied to the needles so as to provide a reinforced area for the high splice and for the heel. Such manner of knitting is preferably continued from the line 6 to the line 7, thus providing a transverse zone which, when subsequently severed on the line 9, will be of sufficient width and extent to provide two high splice members 10 and 11 and two heel members 12, 13. Desirably beginning at about the line 7, I introduce the additional thread to the needles only along the lateral edges of the blank as indicated at 14, 15, and at the middle portion 16, I use only the main thread which it will be understood is also used at the lateral edge portions 14, 15, which are selvaged. My invention, however, is not limited to the use of threads as described, since any other suitable arrangement of threads may be employed, as, for example, a single heavy thread only, across the entire unitary blank or a main thread and a reinforcing thread across the entire width of the blank throughout the entire extent thereof. Preferably, however, at the central portion 16 from the line 7 down to a line 17, where the toe structure begins, I use only a single thread, since such part 16 of the blank is to be cut away and becomes waste unless adapted to other uses. As indicated at 18, 19, the feeding of the additional or reinforcing threads may be increased in a stepped or varying manner by suitably adjusting the stops of the machine which control or limit the movements of the additional thread guides. When the line 17 is reached the toe portion 20 is knitted from the same yarn or yarns as the portions 10 to 15, which in the present embodiment of the invention would be by the use of a main yarn and a reinforcing yarn. During the knitting of the toe portion I preferably fashion the same as indicated at 4, 4. Such toe portion is continued to the line 21 and, according to the disclosure in Fig. 3, knitting is at once resumed of the full width of the foot to provide the next foot.

It will be unnecessary to describe in detail the knitting of the separate blanks of Figs. 4 and 5, since it is desirably the same as for knitting the continuous blank of Fig. 3, excepting that each is knitted as a separate, unitary structure.

With respect to all the blanks, as shown at 22, 23 of Fig. 5, I cut or trim in any suitable manner the heel corners as there indicated, thereby suitably rounding the same. When the knitting of the several blanks, or any of them, has been completed, I then cut out the central portion 16, taking pains not to cut into the material of the lateral edges 14, 15. I also cut apart the end zone along the line 9, thereby providing the two high splice areas.

It is to be understood that my invention comprises or includes the making of a high splice as described, of any shape or design, whether the same be parallel sided or be tapered to a point or to a narrower blunt end. In fact, my invention may be practised in connection with and contemplates providing any character or shape of high splice.

When the blank has been trimmed or cut away as described, I then employ any suitable mechanism, as, for example, a Merrow or other sewing machine having knives or trimming attachments, to sew, seam or loop the described unitary blank to the leg and top of the foot blank of Figs. 1 and 2.

When the leg is knitted of a mesh or lace or like material, it would not be possible or practicable to provide a reinforced high splice integral therewith. My invention therefore provides for a stocking, the leg whereof may be of a mesh, lace or like material, but having a reinforced high splice of any desired design or shape.

Referring again to Fig. 2, it will be understood that the completed blank 8 is there shown as seamed, sewed, looped or otherwise secured along a continuous line 24 which extends from the top of the high splice portion down along the heel, the sole and toe. It will also be understood that if the stocking leg be of a full fashioned character, it will be seamed at 3a along the lateral or selvage edges 3 and that such seaming will extend down the back of the high splice, the back of the heel, along the middle of the sole of the foot and along the bottom and top of the toe.

In Fig. 6, I have indicated a slight modification constituting a simulation of the full fashioned structure or effect at the front of the heel. This I accomplish by providing a loosely knitted course along the line which is indicated at 25 across the blank or, if desired, I may provide a still heavier reinforced section at the heel portion only so as to distinguish it from the next succeeding portion of the blank which would be at the commencement of the lateral edge portions 14, 15 of Figs. 3, 4 and 5. In Figs. 7 to 14 inclusive, I have represented the blank 8 of my invention as applied respectively to a woven stocking 25 in Fig. 7, to a mesh knit stocking 26 in Fig. 8, to a close, plain knit stocking 27 in Fig. 9, to a Milanese knitted stocking 28 in Fig. 10, to a lace knitted stocking 29 in Fig. 11, to a crocheted stocking 31 in Fig. 13, and to a tatted stocking 32 in Fig. 14.

The woven stocking of Fig. 7 would be cut to shape, but the stocking leg of Figs. 8, 9, 10, 11 may be fashioned during formation. The stocking leg of Figs. 12, 13 and 14 may be formed in any suitable manner.

I have stated that the high splice may be parallel sided or tapered to a point or to a narrow blunt end. A high splice tapered to a point is indicated at 33 in Fig. 9, and a high splice tapered to a narrow blunt end is indicated at 34 in Fig. 10.

Obviously, whatever the construction of the leg portion of the stocking, the high splice, which is a part of the blank of my invention, may be of any desired shape.

In Fig. 15, I have indicated at 35 the blank cut at 36 and 37 to provide the proper shape, and in Fig. 16 I have represented the blank as folded to shape and sewed along the line 38, and as having the blank 8 of my invention sewed thereto. In Fig. 17, I have represented a circular knit stocking 39 having, however, a split work ankle portion or ankle and foot portion, one of the suture seams being indicated at 40 in Fig. 17. If the split work effect extends into the foot, then a part of the sole of the split work foot is cut away so as to have the blank 8 of my invention secured to the leg portion of the stocking. Preferably, however, the split work effect would extend only through the ankle, and the foot would be knitted by regular circular work, and then the lower part would be cut away so that the blank 8 could be secured thereto.

In Fig. 18, I have represented a portion of the blank 8, and have represented a loose course at 41 as a guide for cutting the blank in those cases in which the knitting commences above the loose course.

Having thus described one illustrative embodiment of the invention and the best mode known to me for carrying out the method of my invention, it is to be understood that although specific terms are employed, they are used in a generic and descriptive sense and not for purposes of limitation, the scope of the invention being set forth in the following claims.

I claim:

1. A unitary blank for a stocking comprising high splice, heel, sole and toe members, all knitted of a main yarn and a reinforcing yarn or yarns, the said blank having interior cut edges (produced by cutting away a central portion of the blank) adapted to be suitably secured to the edges of the leg and instep or foot-top portion and having outer selvaged edges adapted to be seamed together.

2. A unitary blank for a stocking comprising high splice, heel, sole and toe members all knitted of a main yarn and a reinforcing yarn or yarns, said blank composed of plain knitting, the courses whereof extend lengthwise the high splice portions, whereby the high splice portions are substantially non-expansible in the direction crosswise of the ankle, so that the shape of the ankle portion is maintained, the said blank having interior cut edges and adapted to be suitably secured to the edges of a leg and instep or foot-top portion.

3. That method of making a continuous blank for subsequent attachment to a leg and instep blank comprising the following steps; knitting a strip of sufficient width at one end to include high splice portions and heel portions; continuing the knitting to provide at opposite edges lateral portions to constitute the sole of the foot; knitting as a continuation the toe portion; severing the first mentioned end of the strip the width of the high splice portions; removing the central portion of the blank between the lateral edge portions, and thereafter suitably securing said blank to the leg and instep or foot-top portion of a stocking.

4. That method of making a continuous blank for subsequent attachment to a leg and instep blank comprising commencing the blank of full width to furnish two high splice areas to be subsequently separated along a median line; continuing the knitting of the blank to provide opposite sole portions with an intermediate portion to be removed; continuing the knitting to make the toe portion; and during the knitting fashioning the blank adjacent the heel portions and at the toe portion.

5. That method of making a continuous blank for subsequent attachment to a leg and instep blank comprising commencing the blank of full width to furnish two high splice areas to be subsequently separated along a median line; continuing the knitting of the blank to provide opposite sole portions with an intermediate portion to be removed; continuing the knitting to make the toe portion; and during the knitting fashioning the blank adjacent the heel portions and at the toe portion; cutting the high splice end of the blank to an extent equalling the width of the top of the high splice; and removing the central portion of the blank between the sole portions.

6. That method of knitting a unitary blank for subsequent attachment to a leg and instep blank of a stocking which comprises knitting with the main yarn and a reinforcing yarn one end of the blank of sufficient width to provide the high splice and the heel portion; continuing such knitting to provide sufficient width of the high splice; then knitting the sole portions of the foot as the lateral edge portions of the blank the central portion whereof is to be removed but at the said central portion of the blank employing only a single thread; and then continuing the knitting with both the main thread and the reinforcing thread to knit the toe portion of the blank.

7. That method of knitting a unitary blank for subsequent attachment to a leg and instep blank of a stocking which comprises knitting with the main yarn and a reinforcing yarn one end of the blank of sufficient width to provide the high splice and the heel portion; continuing such knitting to provide sufficient width of the high splice; then knitting the sole portions of the foot as the lateral edge portions of the blank but at the said central portion of the blank the central portion whereof is to be removed employing only a single thread; then continuing the knitting with both the main thread and the reinforcing thread to knit the toe portion of the blank, and subsequently seaming the said unitary blank to the leg and instep blank of a stocking.

8. That method of making a continuous blank for subsequent attachment to a leg and instep blank comprising commencing the blank of full width to furnish two high splice areas to be subsequently separated along a median line, continuing the knitting of the blank to provide opposite side portions with an intermediate portion to be removed, and continuing the knitting of the blank to make the toe portion.

BENJAMIN W. HEYMAN.

CERTIFICATE OF CORRECTION.

Patent No. 1,971,321.            August 21, 1934.

BENJAMIN W. HEYMAN.

It is hereby certified that error appears in the printed specification of the above numbered patent requiring correction as follows: Page 3, lines 108 and 109, claim 7, strike out the words "the central portion whereof is to be removed" and insert the same after "blank" in line 107, of said claim; and that the said Letters Patent should be read with this correction therein that the same may conform to the record of the case in the Patent Office.

Signed and sealed this 30th day of October, A. D. 1934.

(Seal)                                   Leslie Frazer
                                            Acting Commissioner of Patents.

the said blank having interior cut edges (produced by cutting away a central portion of the blank) adapted to be suitably secured to the edges of the leg and instep or foot-top portion and having outer selvaged edges adapted to be seamed together.

2. A unitary blank for a stocking comprising high splice, heel, sole and toe members all knitted of a main yarn and a reinforcing yarn or yarns, said blank composed of plain knitting, the courses whereof extend lengthwise the high splice portions, whereby the high splice portions are substantially non-expansible in the direction crosswise of the ankle, so that the shape of the ankle portion is maintained, the said blank having interior cut edges and adapted to be suitably secured to the edges of a leg and instep or foot-top portion.

3. That method of making a continuous blank for subsequent attachment to a leg and instep blank comprising the following steps; knitting a strip of sufficient width at one end to include high splice portions and heel portions; continuing the knitting to provide at opposite edges lateral portions to constitute the sole of the foot; knitting as a continuation the toe portion; severing the first mentioned end of the strip the width of the high splice portions; removing the central portion of the blank between the lateral edge portions, and thereafter suitably securing said blank to the leg and instep or foot-top portion of a stocking.

4. That method of making a continuous blank for subsequent attachment to a leg and instep blank comprising commencing the blank of full width to furnish two high splice areas to be subsequently separated along a median line; continuing the knitting of the blank to provide opposite sole portions with an intermediate portion to be removed; continuing the knitting to make the toe portion; and during the knitting fashioning the blank adjacent the heel portions and at the toe portion.

5. That method of making a continuous blank for subsequent attachment to a leg and instep blank comprising commencing the blank of full width to furnish two high splice areas to be subsequently separated along a median line; continuing the knitting of the blank to provide opposite sole portions with an intermediate portion to be removed; continuing the knitting to make the toe portion; and during the knitting fashioning the blank adjacent the heel portions and at the toe portion; cutting the high splice end of the blank to an extent equalling the width of the top of the high splice; and removing the central portion of the blank between the sole portions.

6. That method of knitting a unitary blank for subsequent attachment to a leg and instep blank of a stocking which comprises knitting with the main yarn and a reinforcing yarn one end of the blank of sufficient width to provide the high splice and the heel portion; continuing such knitting to provide sufficient width of the high splice; then knitting the sole portions of the foot as the lateral edge portions of the blank the central portion whereof is to be removed but at the said central portion of the blank employing only a single thread; and then continuing the knitting with both the main thread and the reinforcing thread to knit the toe portion of the blank.

7. That method of knitting a unitary blank for subsequent attachment to a leg and instep blank of a stocking which comprises knitting with the main yarn and a reinforcing yarn one end of the blank of sufficient width to provide the high splice and the heel portion; continuing such knitting to provide sufficient width of the high splice; then knitting the sole portions of the foot as the lateral edge portions of the blank but at the said central portion of the blank the central portion whereof is to be removed employing only a single thread; then continuing the knitting with both the main thread and the reinforcing thread to knit the toe portion of the blank, and subsequently seaming the said unitary blank to the leg and instep blank of a stocking.

8. That method of making a continuous blank for subsequent attachment to a leg and instep blank comprising commencing the blank of full width to furnish two high splice areas to be subsequently separated along a median line, continuing the knitting of the blank to provide opposite side portions with an intermediate portion to be removed, and continuing the knitting of the blank to make the toe portion.

BENJAMIN W. HEYMAN.

CERTIFICATE OF CORRECTION.

Patent No. 1,971,321.        August 21, 1934.

BENJAMIN W. HEYMAN.

It is hereby certified that error appears in the printed specification of the above numbered patent requiring correction as follows: Page 3, lines 108 and 109, claim 7, strike out the words "the central portion whereof is to be removed" and insert the same after "blank" in line 107, of said claim; and that the said Letters Patent should be read with this correction therein that the same may conform to the record of the case in the Patent Office.

Signed and sealed this 30th day of October, A. D. 1934.

Leslie Frazer (Seal)        Acting Commissioner of Patents.